United States Patent
Ito et al.

(10) Patent No.: US 10,938,064 B2
(45) Date of Patent: Mar. 2, 2021

(54) SULFIDE-TYPE COMPOUND PARTICLES, SOLID ELECTROLYTE, AND LITHIUM SECONDARY BATTERY

(71) Applicant: Mitsui Mining & Smelting Co., Ltd., Tokyo (JP)

(72) Inventors: Takahiro Ito, Ageo (JP); Tsukasa Takahashi, Ageo (JP); Masaru Hyakutake, Ageo (JP); Teruaki Yagi, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 16/982,020

(22) PCT Filed: Sep. 3, 2019

(86) PCT No.: PCT/JP2019/034612
§ 371 (c)(1),
(2) Date: Sep. 17, 2020

(87) PCT Pub. No.: WO2020/050269
PCT Pub. Date: Mar. 12, 2020

(65) Prior Publication Data
US 2021/0020984 A1    Jan. 21, 2021

(30) Foreign Application Priority Data
Sep. 4, 2018    (JP) .............................. JP2018-165316

(51) Int. Cl.
| | |
|---|---|
| *H01M 10/0562* | (2010.01) |
| *C01B 25/14* | (2006.01) |
| *C01B 17/45* | (2006.01) |
| *C01B 17/22* | (2006.01) |
| *H01M 10/0525* | (2010.01) |
| *H01M 4/136* | (2010.01) |
| *H01M 4/58* | (2010.01) |
| *H01M 4/02* | (2006.01) |

(52) U.S. Cl.
CPC ......... *H01M 10/0562* (2013.01); *C01B 17/22* (2013.01); *C01B 17/45* (2013.01); *C01B 25/14* (2013.01); *H01M 4/136* (2013.01); *H01M 4/58* (2013.01); *H01M 10/0525* (2013.01); *C01P 2002/74* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 2014/0154584 A1 | 6/2014 | Nagase et al. |
| 2017/0222257 A1 | 8/2017 | Miyashita et al. |
| 2018/0069262 A1 | 3/2018 | Utsuno et al. |
| 2018/0145311 A1 | 5/2018 | Tojigamori |
| 2018/0166740 A1 | 6/2018 | Iwasaki et al. |
| 2019/0140314 A1 | 5/2019 | Utsuno et al. |
| 2019/0305371 A1 | 10/2019 | Utsuno et al. |
| 2019/0312304 A1 | 10/2019 | Uesugi et al. |

FOREIGN PATENT DOCUMENTS

| | | |
|---|---|---|
| CN | 103733414 A | 4/2014 |
| JP | 201624874 A | 2/2016 |
| JP | 201845997 A | 3/2018 |
| JP | 201867552 A | 4/2018 |
| JP | 201880095 A | 5/2018 |
| JP | 201897954 A | 6/2018 |
| WO | 2018047566 A1 | 3/2018 |

OTHER PUBLICATIONS

Bernges et al., "Competing Structural Influences in the Li Superionic Conducting Argyrodites Li6PS5-xSexBr (0 less than or equal to x less than or equal to 1) Upon Se Substitution", Inorganic Chemistry, 2018, pp. 13920-13928, vol. 57.

Ito et al., "Improvement of Lithium Argyrodite Solid Electrolyte from a Practical Application Stand Point of All Solid State Battery", 58th Battery Symposium in Japan, 2018, pp. 207-208, The Electrochemical Society of Japan, Battery Technology Committee, English-language Abstract.

Kraft et al., "Influence of Lattice Polarizability on the Ionic Conductivity in the Lithium Superionic Argyrodites Li6PS5X (X=Ci, Br, I)", Journal of the American Chemical Society, 2017, pp. 10909-10918, vol. 139.

*Primary Examiner* — Jonathan Crepeau
*Assistant Examiner* — Angela J Martin
(74) *Attorney, Agent, or Firm* — The Webb Law Firm

(57) ABSTRACT

Sulfide-type compound particles microparticulated, having an argyrodite-type crystal structure, and including lithium (Li), phosphorus (P), sulfur (S), and a halogen (Ha). As sulfide-type compound particles that can inhibit generation of hydrogen sulfide gas even upon contact with moisture in the atmosphere, provided are sulfide-type compound particles having D50 in a volume-basis particle size distribution of 50 μm or less and having an occupancy of sulfur (S) and the halogen (Ha) in the S3 (4a) site, as calculated by a neutron diffraction measurement, of 85% or more.

10 Claims, No Drawings

SULFIDE-TYPE COMPOUND PARTICLES, SOLID ELECTROLYTE, AND LITHIUM SECONDARY BATTERY

CROSS-REFERENCE TO RELATED APPLICATIONS

This application is the United States national phase of International Application No. PCT/JP2019/034612 filed Sep. 3, 2019, and claims priority to Japanese Patent Application No. 2018-165316 filed Sep. 4, 2018, the disclosures of which are hereby incorporated by reference in their entirety.

TECHNICAL FIELD

The present invention relates to sulfide-type compound particles that can be suitably used as a solid electrolyte for lithium secondary batteries and the like.

BACKGROUND ART

In all-solid lithium secondary batteries including a sulfide-type solid electrolyte for which lithium sulfide ($Li_2S$) or the like is used as a starting material, no flammable organic solvent is used. Thus, safety devices can be simplified, and the batteries can be made as ones having excellent production costs and productivity. Additionally, such batteries are characterized by achieving a high voltage when laminated in series in a cell. Furthermore, in such a type of solid electrolyte, since nothing but lithium ions moves, side reactions caused by movement of anions do not occur, and the like. This is expected to lead to enhancement of safety and durability.

Japanese Patent Laid-Open No. 2016-24874, which relates to a compound having an argyrodite-type crystal structure and represented by $Li_{7-x-2y}PS_{6-x-y}Cl_x$, discloses a sulfide-type solid electrolyte for lithium ion batteries that contains a compound represented by the compositional formula (1): $Li_{7-x-2y}PS_{6-x-y}Cl_x$, wherein $0.8 \leq x \leq 1.7$, and $0 < y \leq -0.25x+0.5$ are satisfied, as a novel sulfide-type solid electrolyte for lithium ion batteries.

In examples of Japanese Patent Laid-Open No. 2018-67552, as a method for producing a solid electrolyte composed of a compound containing lithium, phosphorus, sulfur, and a halogen and having an argyrodite-type crystal structure, disclosed a production method in which a lithium sulfide ($Li_2S$) powder, a phosphorus pentasulfide ($P_2S_5$) powder, and a lithium chloride (LiCl) powder are mixed, the mixture is heated at 300° C. for four hours while hydrogen sulfide gas is allowed to flow, and then further heated at 500° C. for four hours.

In Japanese Patent Laid-Open No. 2018-80095 (claim 1, paragraph 0028, and the like), as a method for producing a sulfide solid electrolyte capable of reducing the amount of elemental sulfur remaining, a method for producing a sulfide solid electrolyte comprising an introduction step of introducing an electrolyte raw material including at least $Li_2S$ and $P_2S_5$ and elemental sulfur into a vessel, an amorphization step of amorphizing the raw material composition formed of the electrolyte raw material and elemental sulfur after the introduction step to synthesize a sulfide solid electrolyte material, and a thermal treatment step of thermally treating the sulfide solid electrolyte material at a temperature equal to or higher than the melting point of the elemental sulfur and less than a temperature at which a low Li ion conducting phase is produced, that is, a temperature of 300° C. or less, under an inert atmosphere after the amorphization step.

CITATION LIST

Patent Literature

Japanese Patent Laid-Open No. 2016-24874
Japanese Patent Laid-Open No. 2018-67552
Japanese Patent Laid-Open No. 2018-80095, claim 1, paragraph 0028, and the like.

SUMMARY OF INVENTION

The sulfide-type solid electrolyte materials as described above, among these, sulfide-type compounds having an argyrodite-type crystal structure have a high ion conductivity, but may generate hydrogen sulfide gas upon contact with moisture in the atmosphere. For this reason, there has been a problem in that it is necessary to handle sulfide-type compounds in a restricted environment such as dry rooms, where an inert gas having a very low dew point is continually supplied. In particular, when the particle size of sulfide-type compound particles having an argyrodite-type crystal structure is microparticulated to 50 µm or less, which is preferable for a solid electrolyte for lithium secondary batteries, generation of hydrogen sulfide gas tends to markedly increase. Then, there has been a problem in that such particles are more difficult to handle.

Thus, the present invention relates to sulfide-type compound particles microparticulated, having an argyrodite-type crystal structure, and comprising lithium (Li), phosphorus (P), sulfur (S), and a halogen (Ha), and an object thereof is to provide novel sulfide-type compound particles that can inhibit generation of hydrogen sulfide gas even upon contact with moisture in the atmosphere.

The present invention proposes sulfide-type compound particles, having an argyrodite-type crystal structure, and comprising lithium (Li), phosphorus (P), sulfur (S), and a halogen (Ha), wherein D50 in the volume-basis particle size distribution obtained by measurement using a laser diffraction scattering type particle size distribution measurement method is 50 µm or less, and the occupancy of sulfur (S) and the halogen (Ha) in the $S_3$ (4a) site, as calculated by a neutron diffraction measurement, is 85% or more.

The sulfide-type compound particles proposed by the present invention can inhibit generation of hydrogen sulfide gas even upon contact with moisture in the atmosphere. In particular, even when microparticulated to 50 µm or less, suitable for a solid electrolyte for lithium secondary batteries, the particles can inhibit generation of hydrogen sulfide gas. Thus, the particles can be effectively utilized as solid electrolytes for lithium secondary batteries.

DESCRIPTION OF THE INVENTION

Next, the present invention will be described based on an exemplary embodiment. However, the present invention is not intended to be limited to the embodiment described next.

<Present Sulfide-Type Compound Particles>

Sulfide-type compound particles according to one example of the embodiment of the present invention (referred to as the "present sulfide-type compound particles") are sulfide-type compound particles having an argyrodite-type crystal structure, comprising lithium (Li), phosphorus (P), sulfur (S), and a halogen (Ha).

Sulfide-type compounds having an argyrodite-type crystal structure generally have a high ion conductivity as mentioned above, but have a problem of generating hydrogen sulfide upon contact with moisture in the atmosphere. However, it is possible to inhibit generation of hydrogen sulfide by further reducing sulfur defects in sulfur sites, in other words, by enhancing the occupancy of sulfur (S) and a halogen (Ha) in sulfur sites.

The sulfide having an argyrodite-type crystal structure constituting the present sulfide-type compound particles is a sulfide, that is, a sulfur-containing compound, having crystallinity, being a sulfide-type compound having an argyrodite-type crystal structure.

Note that the above "argyrodite-type crystal structure" is a crystalline structure possessed by compound groups derived from a mineral represented by a chemical formula: $Ag_8GeS_6$.

A sulfide-type solid electrolyte means a solid electrolyte formed of a sulfur-containing compound. The solid electrolyte is not a film formed on the electrode material interface by an initial charge and discharge reaction after production of a battery and the like (a so-called SEI (solid electrolyte interphase)), but refers to a solid having a Li ion conductivity that can be used as a substitute for electrolyte solutions and separators in battery designing.

The present sulfide-type compound particles may include other elements than lithium (Li), phosphorus (P), sulfur (S), and a halogen (Ha). For example, there is a potential for replacing a portion of lithium (Li) by an alkali metal, for replacing a portion of phosphorus (P) by a pnictogen element, or for replacing a portion of sulfur (S) by a chalcogen element. The current technology has not been able to find a compound having a crystalline phase of such an argyrodite-type crystal structure and also having excellent performance, but the potential is not denied.

The present sulfide-type compound particles, as long as including a crystalline phase having the above argyrodite-type crystal structure as the main phase, may be formed of a single phase of the crystalline phase or may include a phase different from the phase (this is referred to as a "different phase"). Of course, the different phase may not be included.

Examples of the different phase include $Li_3PS_4$ and halogenated lithium.

The "main phase" means a compound having the largest content ratio (mol ratio) among the compounds constituting the particles (the same applies to the following). Whether a compound is the main phase or not can be determined by calculating its content ratio from the analysis on an X-ray diffraction (XRD) pattern. Thus, the content ratio of the crystalline phase having an argyrodite-type crystal structure is preferably 60% by mass or more, among others, preferably 70% by mass or more, more preferably 80% by mass or more, and even more preferably 90% by mass or more, based on the entire crystalline phases constituting the present sulfide-type compound particles.

Examples of the halogen (Ha) element contained in the present sulfide-type compound particles include fluorine (F), chlorine (Cl), bromine (Br), and iodine (I), and the halogen (Ha) may be one of these or a combination of two or more of these. Among these, bromine (Br) and iodine (I) has a larger ionic radius than that of chlorine (Cl) and is likely to subjected to crystal strain. Thus, sulfur defects are likely to occur. For this reason, it can be conceived that effects of the present invention can be further provided by use of Br or I or both.

A preferable example of the sulfide-type compound having an argyrodite-type crystal structure constituting the present sulfide-type compound particles can include a compositional formula (1): $Li_{7-x}PS_{6-x}Ha_x$, wherein Ha is one or two or more halogen elements, and $0.2 < x \leq 2.0$.

In the compositional formula (1), when "x" representing the molar ratio of the halogen element is more than 0.2, the argyrodite-type crystal structure is stable in proximity to room temperature and a high ion conductivity can be achieved. "x" of 2.0 or less is preferable because a $PS_4$ structure, which is the base skeleton of an argyrodite-type crystal structure, is likely to be formed, and the conductivity of lithium ions can be enhanced.

From such a viewpoint, "x" is preferably more than 0.2 and 2.0 or less, among these, preferably 0.4 or more or 1.7 or less, and particularly more preferably 0.5 or more or 1.65 or less.

In contrast, as the amount of the halogen contained becomes larger, sulfur defects can be further reduced. From such a viewpoint, "x" is preferably 1.4 or more, among others, preferably 1.5 or more, and more preferably 1.55 or more.

When the halogen (Ha) is a combination of a plurality of elements (e.g., Cl and Br), "x" in the above compositional formula (1) is the total value of the molar ratio of each element.

In the above compositional formula (1), when Ha is Cl or Br, the total molar ratio of Cl and Br, x, preferably satisfies $1.0 < x \leq 1.8$.

When the molar ratio of Cl is designated as y, the molar ratio of Br is designated as z, a total molar ratio of Cl and Br, x (=y+z), of more than 1.0 and 1.8 or less is preferable because the ion conductivity can be further enhanced. In particular, when x is 1.8 or less, it is possible to inhibit generation of a different phase and to inhibit a decrease in the ion conductivity.

From such a viewpoint, when Ha is Cl or Br, x in the above compositional formula (1) is preferably more than 1.0 and 1.8 or less, among these, preferably 1.1 or more or 1.7 or less, and more preferably 1.2 or more or 1.6 or less.

When Cl and Br are included as Ha, the ratio of the molar ratio of Br, z, to the molar ratio of Cl, y, (z/y), is preferably 0.1 to 10.

A ratio of the molar ratio of Br to the molar ratio of Cl (z/y) of 0.1 or more is preferable because the present sulfide-type compound particles have a low elastic modulus. In contrast, the (z/y) of 10 or less is preferable because the particles have a high ion conductivity.

From such a viewpoint, the (z/y) is preferably 0.1 to 10, among others, preferably 0.2 or more or 5 or less, and more preferably 0.3 or more or 3 or less.

The present sulfide-type compound particles may contain other substances than lithium (Li), phosphorus (P), sulfur (S), and a halogen (Ha), for example, inevitable impurities. The content thereof is preferably less than 5 mol %, more preferably less than 3 mol %, and particularly preferably less than 1 mol % based on the present sulfide-type compound particles, from the viewpoint of low influence on the performance.

(Neutron Diffraction)

The sulfide-type compound having an argyrodite-type crystal structure constituting the present sulfide-type compound particles is preferably one having an occupancy of sulfur (S) and the halogen (Ha) of 85% or more in the S3 (4a) site, as calculated by neutron diffraction measurement.

The neutron diffraction measurement can measure the content, that is, the occupancy of the element in each site (position) in the crystal structure.

The argyrodite-type crystal structure has sites referred to as an S1 (16e) site, an S2 (4c) site, and an S3 (4a) site, as sulfur sites, that is, sites occupied by sulfur. The S1 site is a site constituting a $PS_4$ unit, S2 site is a site located near the $PS_4$ unit, and the S3 site is a site farthest from the $PS_4$ unit. Among these sulfur sites, it is conceived that the S3 site is most susceptible to the external environment and is likely to cause sulfur defects. In fact, when neutron diffraction measurement is conducted for consideration, it is found that the S3 site is most likely to cause sulfur defects among the S1 to S3 sites and the correlation between sulfur defects and generation of hydrogen sulfide gas is observed. Thus, it is found that generation of hydrogen sulfide gas can be inhibited by reducing the amount of defects in the S3 site.

It is found that occurrence of sulfur defects in the sulfide-type compound causes a decrease in the chemical stability and a decrease in the ion conductivity. Unlike amorphous materials having no periodic array structure, the sulfide-type compound is markedly influenced by occurrence of sulfur defects, and thus, it is preferable to inhibit sulfur defects.

With the proviso that the type and occupancy of elements substituting sulfur (S), besides sulfur (S), among elements constituting the S3 site are known, the amount of defects in the S3 site, that is, the amount of unintended elements among the elements constituting the S3 site can be measured. However, when the type and occupancy thereof are not known, it is difficult to measure the amount of defects. For this reason, in the present invention, the occupancy of sulfur (S) and the halogen (Ha) in the S3 (4a) site is defined. The amount of sulfur defects in the S3 site was construed to be smaller as the occupancy was closer to 100%. When the measurement was actually conducted, it was found that the correlation between the occupancy and generation of hydrogen sulfide gas was observed.

Accordingly, the above sulfide-type compound is one having an occupancy of sulfur (S) and the halogen (Ha) in the S3 (4a) site calculated by neutron diffraction measurement of preferably 85% or more, among others, preferably 87% or more, more preferably 90% or more, and even more preferably 95% or more. The upper limit is ideally 100%, but, in fact, the upper limit can be considered to be of the order of 99%.

In the sulfide-type compound having an argyrodite-type crystal structure constituting the present sulfide-type compound particles, in order to enhance the occupancy of sulfur (S) and the halogen (Ha) in the S3 (4a) site as described above, for example, it is preferable that elemental sulfur be mixed in a solid electrolyte raw material and fired at a temperature higher than 300° C. However, the procedure is not intended to be limited to such a production method.

(Particle Size)

The present sulfide-type compound particles preferably have D50 in a volume-basis particle size distribution (referred to as the "average particle size (D50)" or "D50") obtained by measurement using a laser diffraction scattering type particle size distribution measurement method of 50 μm or less.

D50 of the present sulfide-type compound particles of 50 μm or less is preferable because the present sulfide-type compound particles are more likely to enter gaps with active materials, gaps with a solid electrolyte to be combined for use, and the like to thereby result in an increase in the contact points and contact area. In contrast, D50 of 0.1 μm or more is more preferable because there is no increase in the resistance due to an increase in the surface area of the entire powder constituted by the present sulfide-type compound particles, and there is no difficulty in mixing with active materials.

From such a viewpoint, the average particle size (D50) of the present sulfide-type compound particles is preferably 50 μm or less, among others, preferably 0.1 μm or more, more preferably 0.3 μm or more or 20 μm or less, even more preferably 0.5 μm or more or 10 μm or less, and particularly more preferably 0.5 μm or more or 5 μm or less.

The average particle size (D50) of the present sulfide-type compound particles when the present sulfide-type compound particles are added to electrodes preferably represents 1 to 100% based on the average particle size (D50) of the positive electrode active material or the average particle size (D50) of the negative electrode active material.

An average particle size (D50) of the present sulfide-type compound particles representing 1% or more of the average particle size (D50) of the active material is preferable because it is possible to fill spaces among active material particles without gap. In contrast, D50 representing 100% or less is preferable from the viewpoint of making the energy density of the battery higher because the packing of electrodes can be enhanced.

From such a viewpoint, the average particle size (D50) of the present sulfide-type compound particles represents preferably 1 to 100% of the average particle size (D50) of the active material, among others, preferably 3% or more or 50% or less, and more preferably 5% or more or 30% or less.

<Method for Producing Present Sulfide-Type Compound Particles>

Next, one example of the method for producing the present sulfide-type compound particles will be described. However, the method for producing the present sulfide-type compound particles is not intended to be limited to the method for producing the present sulfide-type compound particles to be described here.

The present sulfide-type compound particles can be produced, for example, by adding elemental sulfur to a solid electrolyte raw material to obtain a mixture ("mixing step") and firing the obtained mixture at a temperature higher than 300° C. while an inert gas or hydrogen sulfide gas ($H_2S$) is allowed to flow ("firing step"). However, the procedure is not intended to be limited to such a production method.

To the method for producing the present sulfide-type compound, other treatments or other steps can be optionally added, as long as the method comprises the mixing step and the firing step. For example, it is possible to add a treatment such as stirring, crushing, or classifying between the mixing step and the firing step or to add a treatment such as stirring, crushing, or classifying after the firing step.

<Mixing Step>

In the present step, it is preferable to mix a solid electrolyte raw material and elemental sulfur to obtain a mixture.

Mixing elemental sulfur to the solid electrolyte raw material before firing enables a sulfur (S) gas from the elemental sulfur to be generated during firing, and even when firing is conducted in an inert gas atmosphere, enables a sufficient sulfur (S) partial pressure to be achieved in the firing atmosphere. Accordingly, even without allowing hydrogen sulfide gas to flow, it is possible to cause a solid phase reaction and crystal growth comparable to those when hydrogen sulfide gas is caused to flow. Thus, the ion conductivity of a solid electrolyte as the product can be consequently achieved.

Among others, elemental sulfur has a sublimable property, and thus, generation of a sulfur (S) gas based on a solid-liquid equilibrium reaction can be expected even at a temperature lower than the melting point. Additionally, at a temperature equal to or higher than the melting point, generation of a sulfur (S) gas due to a liquid-gas equilibrium reaction can be expected. Accordingly, it is possible to further effectively compensate for a decrease in the sulfur (S) partial pressure over a wide temperature range in the firing atmosphere, and even without allowing hydrogen sulfide gas to flow, it is possible to more effectively achieve an ion conductivity comparable to that when hydrogen sulfide gas is allowed to flow.

(Solid Electrolyte Raw Material)

Solid electrolyte raw materials are raw materials for a substance containing an element constituting a sulfide-type solid electrolyte to be produced, being substances that include a lithium (Li)-containing substance, a sulfur (S)-containing substance, a phosphorus (P)-containing substance, and a halogen (Ha)-containing substance.

Examples of the lithium (Li)-containing substance herein include lithium compounds such as lithium sulfide ($Li_2S$), lithium oxide ($Li_2O$), and lithium carbonate ($Li_2CO_3$), and elemental lithium metal.

Examples of the phosphorus (P)-containing substance include phosphorus sulfides such as diphosphorus trisulfide ($P_2S_3$) and diphosphorus pentasulfide ($P_2S_5$), phosphorus compounds such sodium phosphate ($Na_3PO_4$), and elemental phosphorus.

Examples of the sulfur (S)-containing substance include the above lithium sulfide and phosphorus sulfides.

Examples of the Ha (halogen)-containing substance include compounds of one or two or more elements selected from the group consisting of fluorine (F), chlorine (Cl), bromine (Br), and iodine (I) as the Ha (halogen) and one or two or more elements selected from the group consisting of sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), and bismuth (Bi), or compounds including oxygen or sulfur bonded thereto. More specifically examples thereof include halogenated lithiums such as LiF, LiCl, LiBr, and LiI, halogenated phosphoruses such as $PF_3$, $PF_5$, $PCl_3$, $PCl_5$, $POCl_3$, $PBr_3$, $POBr_3$, $PI_3$, $P_2Cl_4$, and $P_2I_4$, halogenated sulfurs such as $SF_2$, $SF_4$, $SF_6$, $S_2F_{10}$, $SCl_2$, $S_2Cl_2$, and $S_2Br_2$, halogenated sodiums such as NaI, NaF, NaCl, and NaBr, and halogenated borons such as $BCl_3$, $BBr_3$, and $BI_3$. One of these may be used, or two or more of these may be used in combination.

(Elemental Sulfur)

The elemental sulfur to be added is only required to be elemental sulfur, which is not a sulfur compound, and is usually solid, for example, powder.

The elemental sulfur to be added may be any of α-sulfur (rhombic sulfur, melting point: 112.8° C., boiling point: 444.6° C.), β-sulfur (monoclinic sulfur, melting point: 119.6° C., boiling point: 444.6° C.), γ-sulfur (monoclinic sulfur, melting point: 106.8° C., boiling point: 444.6° C.), and other sulfur allotropes.

Note that the elemental sulfur referred to herein is additionally added in order to generate a sulfur gas, and is different from the solid electrolyte raw material.

The above elemental sulfur may contain moisture and other impurities as long as such moisture and other impurities does not mix into the solid electrolyte raw material and does not cause deterioration of the characteristics.

In this case, the content of impurities in the above elemental sulfur is typically preferably 3% by mass or less, because influence from deterioration of the characteristics is small. The content is more preferably 1% by mass or less.

The amount of the elemental sulfur to be added preferably represents 5 wt % or more of the total amount of the mixture of the solid electrolyte raw material and the elemental sulfur.

Addition of the elemental sulfur representing 5 wt % or more of the total amount of the mixture can dispose the elemental sulfur across the entire mixture even if a special mixing and dispersion treatment is not conducted. The addition inhibits uneven distribution of a sulfur (S) gas obtained by vaporization of the elemental sulfur, and even without allowing hydrogen sulfide gas to flow during firing, can achieve an ion conductivity comparable to that when hydrogen sulfide gas is allowed to flow. In contrast, when the amount of the elemental sulfur to be mixed is too large, the amount of a solid electrolyte to be obtained decreases, which is not economical. Moreover, when volatilized gaseous sulfur is emitted with exhaust gas and the like, the amount to be redeposited due to cooling increases, raising the risk of clogging of the apparatus. For this reason, the elemental sulfur to be added preferably represents 20 wt % or less of the total amount of the mixture.

From such a viewpoint, the amount of the elemental sulfur to be mixed represents preferably 5 wt % or more, among others, preferably 20 wt % or less, more preferably 15 wt % or less, and even more preferably 10 wt % or less of the total amount of the mixture.

The elemental sulfur may be mixed to the solid electrolyte raw material at any time before firing. For example, after lithium sulfide, phosphorus sulfide, and the halogen compound as the solid electrolyte raw materials are mixed, the elemental sulfur may be mixed. Alternatively, simultaneously with mixing of the solid electrolyte raw material, the elemental sulfur may be mixed. Alternatively, after the elemental sulfur is mixed with any of the solid electrolyte raw materials, for example, a portion of any of lithium sulfide, phosphorus sulfide, and the halogen compound, the residue of the solid electrolyte raw materials, for example, the residue of lithium sulfide, phosphorus sulfide, and the halogen compound may be mixed.

When the elemental sulfur is mixed to the solid electrolyte raw materials, the elemental sulfur is preferably dispersed into the solid electrolyte raw materials. In this case, the elemental sulfur is only required not to be unevenly distributed in the mixture, and need not necessarily be uniformly mixed in the solid electrolyte raw materials. Thus, stirring in a mortar or mixing by a ball mill may be sufficient. Even if a solid electrolyte raw material may not be in direct contact with the elemental sulfur, the elemental sulfur is vaporized to generate a sulfur gas, and a decrease in the sulfur (S) partial pressure in the firing atmosphere can be compensated. It is also possible to heat excess elemental sulfur to the melting point or higher to prevent the excess elemental sulfur from participating in the reaction of forming the intended sulfide-type solid electrolyte.

The method for mixing the solid electrolyte raw materials is not intended to be particularly limited. The solid electrolyte raw materials are only required to be mixed in, for example, a ball mill, a beads mill, a homogenizer, and a mortar.

However, if the solid electrolyte raw materials are mixed using a mechanical milling method and a melt quenching method to thereby apply excessive kinetic energy on the mixture, a portion or all of the sulfur or sulfur compound added in the mixing step stage is vaporized. Thus, it is preferable not to use these mechanical milling method and melt quenching method.

The solid electrolyte raw materials, for example lithium sulfide and phosphorus sulfide, are extremely unstable in the atmosphere and decompose upon reacting with moisture to thereby generate hydrogen sulfide gas or be oxidized. Thus, the above mixing step is conducted preferably in a glove box purged with an inert gas atmosphere.

The mixture obtained in the above mixing step, after subjected to a treatment(s) such as drying, stirring, washing, granulation, and classification, as required, may be fed to the firing step.

<Firing Step>

In the present step, the mixture obtained in the mixing step is only required to be fired at a temperature higher than 300° C.

It is possible to produce a sulfide having crystallinity by mixing the elemental sulfur into the solid electrolyte raw materials and firing the mixture at a temperature higher than 300° C. Additionally, it is possible to further enhance the sulfur partial pressure in proximity to the fired specimen, compared with that in the case of firing while hydrogen sulfide gas is allowed to flow. Thus, it is possible to further inhibit generation of sulfur defects to thereby further inhibit the electron conductivity from increasing.

The firing temperature in this case means the product temperature and can be measured by inserting a thermocouple, for example, into a fired product.

The vessel into which the raw materials are placed in firing may be a vessel having a lid or a vessel having no lid. The vessel is not a hermetic vessel such as a sealed tube but is preferably a vessel in which gases inside and outside the vessel may flow therethrough. This is because the remainder of the elemental sulfur among the elemental sulfur added is enabled to more easily escape out of the system, that is, out of the vessel.

From such a viewpoint, examples of the vessel into which the raw materials are placed in firing include saggars formed of a material such as carbon, alumina, zirconia, and SiC.

Firing is preferably conducted while an inert gas or hydrogen sulfide gas ($H_2S$) is allowed to flow. Among these, the above production method in which the elemental sulfur is mixed into the solid electrolyte raw materials and the mixture is fired is characterized by achieving an ion conductivity comparable to that in the case of firing while hydrogen sulfide gas is allowed to flow, even without allowing hydrogen sulfide gas to flow. Thus, in consideration of the costs on the production equipment, it is more preferable to conduct firing while hydrogen sulfide gas ($H_2S$) is not allowed to flow as far as possible and an inert gas is allowed to flow.

From such a viewpoint, the ratio of the volume of the hydrogen sulfide gas is preferably 50% or less, among others, preferably 30% or less, more preferably 20% or less, even more preferably 10% or less, and still even more preferably 0% (no hydrogen sulfide gas is used), based on the volume of entire gas allowed to flow.

In this case, examples of the inert gas can include nitrogen gas, argon gas, and helium gas.

The firing temperature, that is, the maximum reachable temperature of the product temperature in firing is only required to be a temperature higher than 300° C., among others, preferably 700° C. or less, and more preferably 400° C. or more or 600° C. or less, from the viewpoint of causing a desired solid reaction and a crystallization reaction.

The firing time, that is, the time for heating to a temperature higher than 300° C., is only required to be such that the solid reaction and the crystallization reaction of the mixture sufficiently proceed, and is preferably adjusted as appropriate in accordance with the mixed state or firing temperature of the mixture. Typically, the firing time is preferably one hour to 10 hours, among others, and more preferably 2 hours or more or 6 hours or less.

The temperature elevation rate in firing is preferably 300° C./hr or less from the viewpoint of reducing reaction unevenness. When the viewpoint of maintaining the combustion efficiency is added, the temperature elevation rate is, among others, preferably 50° C./hr or more or 250° C./hr or less, and more preferably 100° C./hr or more or 200° C./hr or less.

Multiple-stage firing may also be carried out, in which the temperature is raised and maintained in a repeated manner.

An example of the multiple-stage firing can include a method in which firing is conducted such that the temperature is raised to 300 to 500° C. at a temperature elevation rate of 50 to 500° C./hr, preferably of 100° C./hr or more or 300° C./hr or less, the temperature is maintained for 1 to 20 hours, then, the temperature is raised to a temperature equal to or higher than the melting point of the elemental sulfur added, for example, 350 to 700° C. at a temperature elevation rate of 50 to 500° C./hr, preferably of 100° C./hr or more or 300° C./hr or less, and the temperature is maintained for 1 to 10 hours.

It is possible to produce a solid electrolyte having high crystallinity by conducting multiple-stage firing as described above. Additionally, excess elemental sulfur can be caused to escape out of the system further securely. Thus, it is possible to prevent the excess elemental sulfur from remaining to thereby further enhance the ion conductivity.

In the present step, the amount of the elemental sulfur remaining after firing is preferably set to 50 wt % or less of the amount before firing.

An amount the elemental sulfur remaining representing 50 wt % or less is preferable because a major portion of excess elemental sulfur not participating in Li ion conduction among the elemental sulfur added can be caused to escape out of the system, the amount of impurities in the solid electrolyte can be effectively reduced, and the ion conductivity can be further enhanced.

From such a viewpoint, the amount remaining is preferably set to 50 wt % or less, among others, more preferably set to 40 wt % or less.

When elemental sulfur is added, a major portion of excess elemental sulfur trapped in pores of the fired solid electrolyte can be caused to escape by firing at a temperature equal to or higher than the melting point of sulfur. Thus, in this case, the amount remaining is preferably 30 wt % or less, among others, preferably 20 wt % or less.

The amount of the elemental sulfur remaining can be determined by measuring the weight of the elemental sulfur added (g) and the amount of weight reduction in the mixture after firing (g) and calculating 100×(the amount of elemental sulfur added–the amount of weight reduction in the mixture before and after firing)/the amount of elemental sulfur added.

The above production method forms an argyrodite-type crystal structure in firing. Thus, a strong mixing energy may not be applied in the mixing step to form the argyrodite-type crystal structure. Alternatively, the argyrodite-type crystal structure may be formed in the stage before firing.

As the method for forming the argyrodite-type crystal structure in the stage before firing, a mechanical stress may be applied using a pulverizer such as a planetary ball mill, a vibration mill, or a tumbling mill, a kneader, or the like. Application of a mechanical stress in this manner can generate a $PS_4$ structure, which is the base skeleton of the argyrodite-type crystal structure.

After the above firing, the fired product is disintegrated and pulverized as required and may be classified as required.

<Applications of Present Sulfide-Type Compound Particles>

The present sulfide-type compound particles can be used as a solid electrolyte layer or a solid electrolyte to be mixed in positive electrode and negative electrode mixtures for all-solid lithium secondary batteries.

For example, an all-solid lithium secondary battery can be configured by forming a layer containing the present sulfide-type compound particles between the positive electrode and the negative electrode.

Examples of the shape of the battery include, a laminate shape, a cylindrical shape, and a rectangular shape.

In this case, the present sulfide-type compound particles, which are crystals having few sulfur defects and high crystalline perfection, have excellent humidity resistance. The sulfide-type compound particles are less likely to undergo deterioration of characteristics even if handled in dry air, and thus, the operation of assembling all-solid lithium secondary batteries can be carried out even in, for example, a dry room or the like.

Here, a layer containing the present sulfide-type compound particles can be produced by, for example, a method of dropping a slurry composed of the present sulfide-type compound particles, a binder, and a solvent on a substrate and cutting the substrate by rubbing with a doctor blade or the like, a method of contacting a substrate with the slurry and then cutting the substrate with an air knife, a method of forming a coating film by a screen printing process or the like and then eliminating the solvent through heating and drying, or the like. Alternatively, such a layer can also be produced by producing a green compact from a powder of the present sulfide-type compound particles using a press or the like and then appropriately processing the green compact.

From the viewpoint of enhancing the lithium ion conductivity, in the layer containing the present sulfide-type compound particles, the porosity is set to preferably 50% or less, among others, preferably 30% or less, and more preferably 20% or less. Thus, the layer is preferably produced by pressing a powder of the present sulfide-type compound particles at 20 MPa or more.

Here, the porosity can be calculated by a relational formula described below, from the true density and apparent density of the layer containing the present sulfide-type compound particles, which are obtained by a liquid-phase method (Archimedes method), for example.

Porosity (%)=(true density−apparent density)/true density×100

The layer containing the present sulfide-type compound particles is typically preferably 5 to 300 μm, among others, more preferably 10 μm or more or 100 μm or less, from the balance between prevention of short-circuiting and the volumetric capacity density.

It is also possible to use a solid electrolyte layer obtained by mixing the present sulfide-type compound particles and another solid electrolyte. The present sulfide-type compound particles can be used in combination with any of amorphous materials (glass), glass ceramics, and crystalline materials. Specific examples of the sulfide-type solid electrolyte include $Li_2S$—$P_2S_5$ types, $Li_4P_2S_6$, and $Li_7P_3S_{11}$. The solid electrolyte to be combined may be a non-sulfide electrode, for example, may be an oxide-based solid electrolyte.

As the positive electrode material, any positive electrode material used as a positive electrode active material for lithium secondary batteries can be used as appropriate. Examples thereof can include lithium-containing positive electrode active materials, specifically such as spinel-type lithium transition metal compounds and lithium metal oxides having a layered structure. Enhancement of the energy density can be achieved by using a high-voltage system positive electrode material.

The positive electrode material may be allowed to contain a conductive material or other materials in addition to the positive electrode active material to produce a positive electrode mixture.

Also, as for the negative electrode material, any negative electrode material used as a negative electrode active material for lithium secondary batteries can be used as appropriate. For example, since the present sulfide-type compound particles are electrochemically stable, it is possible to use lithium metal or a carbon-based material, such as graphite, artificial graphite, natural graphite, or non-graphitizable carbon (hard carbon), which is charged and discharged at a low potential comparable to lithium metal (about 0.1 V vs Li+/Li). Accordingly, it is possible to markedly enhance the energy density of all-solid lithium secondary batteries. Silicon or tin, which is promising as a high capacity material, can also be used as an active material. In a lithium secondary battery including a common electrolytic solution, the electrolytic solution reacts with the active material in association with charging and discharging, corrosion occurs on the surface of the active material, and thus the battery characteristics markedly deteriorate. When the present sulfide-type compound particles are used as an electrolyte of a lithium secondary battery and silicon or tin is used for the negative electrode active material, such a corrosion reaction does not occur, and thus enhancement of the durability of the battery can be achieved.

The negative electrode material also may be allowed to contain a conductive material or other materials in addition to the negative electrode active material to produce a negative electrode mixture.

<Present Solid Electrolyte>

The solid electrolyte according to one example of the embodiment of the present invention (referred to as "the present solid electrolyte") is a solid electrolyte having the present sulfide-type compound described above.

The present solid electrolyte may be one composed only of the present sulfide-type compound particles described above or may be one obtained by mixing the present sulfide-type compound particles and other compound particles.

However, in the present solid electrolyte, the content ratio of the present sulfide-type compound particles described above is preferably 50% by mass or more, among others, preferably 80% by mass or more, more preferably 90% by mass or more, and even more preferably 99% by mass or more (100% by mass inclusive).

The present solid electrolyte preferably has D50 in a volume-basis particle size distribution obtained by measurement using a laser diffraction scattering type particle size distribution measurement method of 50 μm or less.

D50 of the present solid electrolyte of 50 μm or less is preferable because the present solid electrolyte is more likely to enter gaps with active materials, gaps with a solid electrolyte to be combined for use, and the like to thereby result in an increase in the contact points and contact area. In contrast, D50 of 0.1 μm or more is more preferable because there is no increase in the resistance due to an increase in the surface area of the present solid electrolyte, and there is no difficulty in mixing with active materials.

From such a viewpoint, the average particle size (D50) of the present solid electrolyte is preferably 50 μm or less, among others, preferably 0.1 μm or more, more preferably 0.3 μm or more or 20 μm or less, even more preferably 0.5

μm or more or 10 μm or less, and particularly more preferably 0.5 μm or more or 5 μm or less.

Explanation of Terms

In the present invention, in the case of being described as "X to Y" (X and Y are arbitrary numbers), it includes the meaning of being "preferably greater than X" or "preferably smaller than Y" together with the meaning of being "X or more and Y or less" unless otherwise stated.

In addition, in the case of being described as "X or more" or "X≤" (X is an arbitrary number), it includes the intention to be "preferably greater than X," and in the case of being described as "Y or less" or "Y≥" (Y is an arbitrary number), it includes the intention to be "preferably less than Y."

EXAMPLES

Hereinbelow, the present invention will be described more in detail with reference to the following Examples and Comparative Examples.

Example 1

In order to allow a compound having an argyrodite-type crystal structure to have a composition of $Li_{5.4}PS_{4.4}Cl_{0.8}Br_{0.8}$, a lithium sulfide ($Li_2S$) powder, a diphosphorus pentasulfide ($P_2S_5$) powder, a lithium chloride (LiCl) powder, and a lithium bromide (LiBr) powder were each weighed so as to be 5 g in the total amount, and pulverized and mixed in a ball mill for 15 hours. Then, 0.26 g of an elemental sulfur powder (α-sulfur, impurity content: 0.5% by mass, melting point: 112.8° C., boiling point: 444.6° C.), which represented 5 wt % of the total mixing powders, was added, and mixing was conducted in a mortar to obtain a mixed powder.

Then, the mixed powder obtained was introduced into a vessel made of carbon (40 mm×30 mm×20 mm, non-hermetic) to 80% by volume of the vessel, and heated in a tubular electric furnace while Ar gas (Ar: 100% by volume, hydrogen sulfide gas: 0% by volume) was allowed to flow at 1.0 l/min at 300° C. (product temperature) for four hours, and then further heated at 500° C. (product temperature) for four hours. The temperature elevation and lowering rate was set to 200° C./hr. Thereafter, the specimen was disintegrated in a ball mill and granulated with a sieve having an opening of 53 μm to obtain a powder-form sample.

In this case, the weighing, mixing, setting to the electric furnace, removal from the electric furnace, disintegration, and granulation operations were all conducted in a glove box purged with sufficiently-dried Ar gas (dew point: −60° C. or less) to thereby obtain a compound powder (sample) represented by a compositional formula: $Li_{5.4}PS_{4.4}Cl_{0.8}Br_{0.8}$. The amount of the elemental sulfur remaining after firing represented 0 wt %.

Comparative Example 1

A compound powder (sample) represented by a compositional formula: $Li_{5.4}PS_{4.4}Cl_{0.8}Br_{0.8}$ was obtained in the same manner as in Example 1 except that no elemental sulfur powder was added and that heating was conducted while $H_2S$ gas, instead of the Ar gas, was allowed to flow in Example 1.

Comparative Example 2

A compound powder (sample) represented by a compositional formula: $Li_{5.4}PS_{4.4}Cl_{0.8}Br_{0.8}$ was obtained in the same manner as in Example 1 except that no elemental sulfur powder was added in Example 1.

Example 2

A compound powder (sample) represented by a compositional formula: $Li_{5.8}PS_{4.8}Cl_{1.2}$ was obtained in the same manner as in Example 1 except that a lithium sulfide ($Li_2S$) powder, a diphosphorus pentasulfide ($P_2S_5$) powder, and a lithium chloride (LiCl) powder were mixed in order to allow a compound having an argyrodite-type crystal structure to have a composition of $Li_{5.8}PS_{4.8}Cl_{1.2}$ in Example 1.

<Measurement of Elemental Composition>

Each of the compound powders (samples) obtained Examples and Comparative Examples was entirely dissolved, and the elemental composition was measured by ICP emission spectrometry. The result thereof was confirmed to generally correspond to the compounding ratio of the raw material compounds fed.

<X-Ray Diffraction Measurement>

The compound powders (samples) obtained in Examples and Comparative Examples were analyzed by an X-ray diffraction method (XRD, Cu ray source) to obtain X-ray diffraction patterns, and the peak intensity (counts) in each position was measured. The measurement was conducted using an XRD apparatus "Smart Lab" manufactured by Rigaku Corporation in the atmosphere under conditions of scanning axis: 2θ/θ, scanning range: 10 to 140 deg, step width: 0.01 deg, and scanning rate: 1 deg/min. A Si powder (manufactured by Wako Pure Chemical Industries, Ltd., purity: 99.9%) was mixed in an amount of 5 wt % was mixed as the internal standard and used for angle correction.

Diffraction peaks other than peaks derived from the argyrodite-type crystal structure or peaks assigned to the Si powder for internal standard were taken as different phase peaks. For identification of the peaks derived from the argyrodite-type crystal structure, data of PDF number: 00-034-0688 was used.

Among the peaks derived from the argyrodite-type crystal structure, the ratio of the highest peak intensity, among the different phase peaks, to the intensity of the peaks appearing at the position of the diffraction angle 2θ=24.9° to 26.3° was examined. Then, when no different phase peak was present or the ratio was less than 0.04, the argyrodite-type crystal structure was determined as a "single phase", and when the ratio was 0.04 or more, it was determined that a "different phase is present".

<X-Ray Rietveld Analysis>

The XRD data of the compound powders (samples) obtained in Examples and Comparative Examples were used to conduct Rietveld analysis described below.

The Rietveld analysis was conducted using the XRD data measured under the above conditions by means of analysis software "RIETAN-FP v2.8.3." In this case, the valid indices were set to $R_{wp}$<10 and S<2.0.

<Neutron Diffraction>

The compound powders (samples) obtained in Examples and Comparative Examples were subjected to neutron diffraction measurement in BL20 of the Japan Proton Accelerator Research Complex, J-PARC center under conditions of power: 300 kW, double frame (DF), and 2 hours/sample. The neutron diffraction data obtained were analyzed by means of analysis software "Z-Rietveld." In this case, the valid indices were set to $R_{wp}$<10 and S<2.0.

The results of the X-ray diffraction measurement, X-ray Rietveld analysis, and neutron diffraction were put together to determine that the samples were compounds composed of an argyrodite-type crystal structure. The results of composition quantification by ICP emission spectrometry generally corresponded to the compositional formula: $Li_{5.4}PS_{4.4}Cl_{0.8}Br_{0.8}$ or $Li_{5.8}PS_{4.8}Cl_{1.2}$, as calculated from the compounding ratio of the raw material compounds fed. The composition of the compounds composed of an argyrodite-type crystal structure as calculated from the compounding ratio of the raw material compounds fed and the occupancy in the S3 site of the compound powders (samples) obtained in Examples and Comparative Examples are shown in Table 1.

<D50>

Each of the compound powders (samples) obtained in Examples and Comparative Examples was introduced in a water-soluble solvent using an automatic sample supply machine for a laser diffraction particle size distribution measuring apparatus ("Microtorac SDC" manufactured by MicrotracBEL Corp.), and irradiated with ultrasonic waves of 40 W for 360 seconds, a plurality of times, in a flow rate of 40%. Then, the particle size distribution was measured using a laser diffraction particle size distribution measuring apparatus "MT3000II" manufactured by MicrotracBEL Corp., and D50 was determined from the volume-basis particle size distribution chart obtained.

The number of times of irradiation of ultrasonic waves was taken as the number of times required until the change ratio of D50 between before and after irradiation of ultrasonic waves reached 8% or less.

The water-soluble solvent during measurement was allowed to pass through a filter of 60 µm, the refractive index of the solvent was set to 1.33, the condition of particle permeability was set to permeation, the refractive index of particles was set to 2.46, the shape was set to a non-spherical shape, the measurement range was set to 0.133 to 704.0 µm, and the measurement time was set to 30 seconds. The average value obtained by conducting measurement twice was taken as the value of each sample.

<Measurement of Amount of Hydrogen Sulfide ($H_2S$) Generated>

Fifty milligrams of each of the compound powders (samples) obtained in Examples and Comparative Examples were weighed in a glove box purged with sufficiently-dried Ar gas (dew point: −60° C. or less) and placed in a bag sealed with a laminate film. Thereafter, a glass separable flask having a capacity of 1500 $cm^3$ was placed in a constant temperature and constant humidity chamber maintained at room temperature (25° C.) under an atmosphere having a dew point of −30° C. adjusted by mixing dry air and ambient air, and maintained until the environment inside the separable flask became the same as the environment of the constant temperature and constant humidity chamber. Then, the sealed bag containing the sample was opened in the constant temperature and constant humidity chamber, and the sample was quickly placed into the separable flask. As for hydrogen sulfide which was generated immediately after the sample was placed into the separable flask and the flask was sealed until 60 minutes elapsed, the hydrogen sulfide concentration at 60 minutes after was measured with a hydrogen sulfide sensor (GX-2009 manufactured by Riken Keiki Co., Ltd.). Then, the amount of hydrogen sulfide generated was determined by calculating the volume of hydrogen sulfide from the hydrogen sulfide concentration after the elapse of 60 minutes.

<Measurement of Ion Conductivity>

Each of the compound powders (samples) obtained in Examples and Comparative Examples was subjected to a uniaxial pressing molding in a glove box purged with sufficiently-dried Ar gas (dew point: −60° C. or less). Each of the uniaxially pressing-molded samples was additionally formed into a pellet having a diameter of 10 mm and a thickness of 4 to 5 mm in a cold isostatic pressing (CIP) apparatus at 200 MPa. Additionally, the upper and lower faces of the pellet were coated with carbon paste as electrodes, and then subjected to a heat treatment at 180° C. for 30 minutes to produce a sample for ion conductivity measurement.

The ion conductivity (mS/cm) was measured at room temperature (25° C.) using Solartron 1255B, which is an apparatus of TOYO Corporation, under a condition of a measurement frequency of 0.1 Hz to 1 MHz by an alternating-current impedance method. The results are shown in Table 1.

<Production and Evaluation of all-Solid Battery Cell>

Only the compound powders (samples) each obtained in Examples 1 and 2 were used as the solid electrolyte to prepare a positive electrode mixture and a negative electrode mixture. Then, all-solid batteries were produced and subjected to evaluation of the battery characteristics (initial charge and discharge capacity).

(Material)

As the positive electrode active material, a $LiNi_{0.5}Co_{0.2}Mn_{0.3}O_2$ (NCM) powder (D50=6.7 µm), which was a lamellar compound, was used. As the negative electrode active material, graphite (D50=20 µm) was used. As the solid electrolyte powder, the sample obtained in each Example was used.

(Mixture Preparation)

The positive electrode active material powder, the solid electrolyte powder, and a conductive aid (acetylene black) powder were mixed in a mortar at a mass ratio of 60:37:3 to prepare a positive electrode mixture powder. The powder obtained was uniaxially press-molded at 20 MPa to thereby obtain a positive electrode mixture pellet.

The powder and the solid electrolyte powder were mixed in a mortar at a mass ratio of 64:36 to prepare a negative electrode mixture powder.

(Production of all-Solid Battery Cell)

In a polypropylene cylinder having a top opening and a bottom opening (opening diameter: 10.5 mm, height: 18 mm), the bottom opening was blocked with a positive electrode (made of SUS), and the positive electrode mixture pellet was mounted on the positive electrode. The powder solid electrolyte obtained in Example 1 was mounted thereon, and uniaxially press-molding was conducted at 180 MPa to form a positive electrode mixture and a solid electrolyte layer. After the negative electrode mixture powder was mounted thereon, the top opening was blocked with a negative electrode (made of SUS), and uniaxially molding was conducted at 550 MPa to thereby produce an all-solid battery cell having a three-layer structure comprising the positive electrode mixture having a thickness of approximately 100 µm, the solid electrolyte layer having a thickness of approximately 300 µm, and the negative electrode mixture having a thickness of approximately 20 µm. In this case, the above all-solid battery cell was produced in a glove box purged with an argon gas having a dew point temperature of −60° C.

(Evaluation of Battery Characteristics (Initial Charge and Discharge Capacity))

The battery characteristics were evaluated while the all-solid battery cell was placed in an environment tester maintained at 25° C. and connected to a charge and discharge measurement apparatus. Each battery was charged and discharged while 1 mA was taken as 1 C. Charging was conducted at 0.1 C to 4.5 V with a CC-CV mode to obtain the initial charge capacity. Discharging was conducted at 0.1 C to 2.5 V with a CC mode to obtain the initial discharge capacity.

Discharge capacity when discharging was conducted at 0.1 C to 2.5 V was 160 mAh/g or more for either battery. Since the solid electrolyte achieves a practicable ion conductivity, it can be conceived that a practical discharge capacity was enabled to be exhibited.

TABLE 1

|  | Composition | XDR determination | Particle size D50 (μm) | Conductivity (mS/cm) | Occupancy of S and Ha in S3 (4a) site (%) | | | | Amount of $H_2S$ generated $(cm^3/g)$ |
| --- | --- | --- | --- | --- | --- | --- | --- | --- | --- |
|  |  |  |  |  | S | Cl | Br | Total |  |
| Example 1 | $Li_{5.4}PS_{4.4}Cl_{0.8}Br_{0.8}$ | Single phase | 3.2 | 6.2 | 36.3 | 30.9 | 30.8 | 98 | 0.24 |
| Comparative Example 1 | $Li_{5.4}PS_{4.4}Cl_{0.8}Br_{0.8}$ | Different phase is present | 2.1 | 6.4 | 10.1 | 37.1 | 35.8 | 83 | 0.53 |
| Comparative Example 2 | $Li_{5.4}PS_{4.4}Cl_{0.8}Br_{0.8}$ | Different phase is present | 3.9 | 2.4 | 4.6 | 39.4 | 39.1 | 83 | 0.48 |
| Example 2 | $Li_{5.8}PS_{4.8}Cl_{1.2}$ | Single phase | 4.7 | 2.3 | 39 | 54 | 0 | 93 | 0.15 |

From the results of the above Examples and Comparative Examples and the results of the tests conducted so far, it has been found that, when sulfide-type compound particles having an argyrodite-type crystal structure, containing lithium (Li), phosphorus (P), sulfur (S), and a halogen (Ha) has an occupancy of sulfur (S) and the halogen (Ha) in the S3 (4a) site of 85% or more, as calculated by neutron diffraction measurement, the particles can effectively inhibit generation of hydrogen sulfide gas even upon contact with moisture in the atmosphere. It has been found that, even when microparticulated to 50 μm or less, suitable for a solid electrolyte for lithium secondary batteries, in particular, the particles can inhibit generation of hydrogen sulfide gas.

The invention claimed is:

1. Sulfide-type compound particles having an argyrodite-type crystal structure, comprising lithium (Li), phosphorus (P), sulfur (S) and a halogen (Ha), wherein
D50 in a volume-basis particle size distribution obtained by measurement using a laser diffraction scattering type particle size distribution measurement method is 50 μm or less, and
the occupancy of sulfur (S) and the halogen (Ha) in the S3 (4a) site, as calculated by a neutron diffraction measurement, is 85% or more.

2. The sulfide-type compound particles according to claim 1, comprising, as the halogen (Ha), one or two or more of fluorine (F), chlorine (Cl), bromine (Br), and iodine (I).

3. A solid electrolyte comprising the sulfide-type compound particles according to claim 1.

4. The solid electrolyte according to claim 3, wherein D50 in the volume-basis particle size distribution obtained by measurement using a laser diffraction scattering type particle size distribution measurement method is 50 μm or less.

5. An electrode material for a lithium secondary battery, comprising the solid electrolyte according to claim 3, and a positive electrode active material and/or a negative electrode active material.

6. A lithium secondary battery comprising a layer comprising the solid electrolyte according to claim 3.

7. A solid electrolyte comprising the sulfide-type compound particles according to claim 2.

8. The solid electrolyte according to claim 7, wherein D50 in the volume-basis particle size distribution obtained by measurement using a laser diffraction scattering type particle size distribution measurement method is 50 μm or less.

9. An electrode material for a lithium secondary battery, comprising the solid electrolyte according to claim 7, and a positive electrode active material and/or a negative electrode active material.

10. A lithium secondary battery comprising a layer comprising the solid electrolyte according to claim 7.

* * * * *